United States Patent
Wei et al.

(10) Patent No.: US 7,477,531 B2
(45) Date of Patent: Jan. 13, 2009

(54) COMPENSATION CIRCUIT FOR USE WITH A THREE-PHASE DRIVE POWERING A SINGLE-PHASE LOAD

(75) Inventors: Lixiang Wei, Whitefish Bay, WI (US); Gary L. Skibinski, Milwaukee, WI (US); Richard A. Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 242 days.

(21) Appl. No.: 11/461,688

(22) Filed: Aug. 1, 2006

(65) Prior Publication Data

US 2007/0030706 A1 Feb. 8, 2007

Related U.S. Application Data

(60) Provisional application No. 60/704,614, filed on Aug. 2, 2005.

(51) Int. Cl.
*H02M 5/458* (2006.01)

(52) U.S. Cl. .......................................... 363/37; 363/40

(58) Field of Classification Search .................. 363/34, 363/35, 37, 39, 40, 44, 47, 48
See application file for complete search history.

(56) References Cited

U.S. PATENT DOCUMENTS

| | | | | |
|---|---|---|---|---|
| 3,746,963 A * | 7/1973 | VeNard, II | ................... | 363/47 |
| 4,651,265 A * | 3/1987 | Stacey et al. | .................. | 363/35 |
| 4,689,735 A * | 8/1987 | Young | ......................... | 363/155 |
| 4,935,860 A * | 6/1990 | Kirchberg et al. | ............. | 363/39 |
| 4,977,492 A * | 12/1990 | Kirchberg et al. | ............. | 363/41 |
| 5,047,910 A | 9/1991 | Levran | | |
| 6,014,017 A * | 1/2000 | Weinhold et al. | ........... | 323/207 |
| 6,191,676 B1 | 2/2001 | Gabor | | |
| 6,288,915 B1 * | 9/2001 | Stemmler et al. | ............. | 363/34 |
| 6,995,992 B2 | 2/2006 | Wei et al. | | |

OTHER PUBLICATIONS

Toshihisa Shimizu, et al., A Unity Power Factor PWM Rectifier with DC Ripple Compensation, IEEE Transactions on Industrial Electronics, vol. 44, No. 4, Aug. 1997.
S. B. Dewan, et al. Steady-State Analysis of Static Single-Phase to Three-Phase Converters, 1981 IEEE, University of Toronto, Toronto, M5S 1A4 Ontario Canada.
Shahidul I. Kahn, et al., A Novel Single- to Three-Phase Static Converter, IEEE Transactions on Industry Applications, vol. 25, No. 1, Jan./Feb. 1989.
Francisco F. Zapata, et al., Analysis and Design of a Single-Phase PWM Current Source Rectifier with Neutral Lag, 1998 IEEE, Concepcion, Chile.

(Continued)

*Primary Examiner*—Jeffrey L Sterrett
(74) *Attorney, Agent, or Firm*—Quarles & Brady LLP; Alexander R. Kuszewski

(57) ABSTRACT

A compensator circuit for reducing low order current harmonics in a three-phase drive system driving a single-phase load, the three-phase drive system including a three-phase source voltage connected to a rectifier system connected to a DC link capacitor connected to a three-phase voltage source inverter that supplies three-phase power.

23 Claims, 5 Drawing Sheets

OTHER PUBLICATIONS

Makoto Saito, et al., A Single to Three Phase Matrix Converter with a Power Decupling (sic) Capability, 2004 35th Annual IEEE Power Electronics Specialists Conference, Aachen, Germany, 2004.

Koichi Tsuno, and Toshihisa Shimizu, et al., Optimization of the DC Ripple Energy Compensating Circuit on a Single-phase Voltage Source PWM Rectifier, 2004 35th Annual IEEE Power Electronics Specialists Conference, Aachen, Germany, 2004.

* cited by examiner

COMPENSATION CIRCUIT FOR USE WITH A THREE-PHASE DRIVE POWERING A SINGLE-PHASE LOAD

CROSS-REFERENCE TO RELATED APPLICATIONS

This application claims the benefit of U.S. Provisional application 60/704,614 filed Aug. 2, 2005, hereby incorporated by reference.

STATEMENT REGARDING FEDERALLY SPONSORED RESEARCH OR DEVELOPMENT

Not applicable.

BACKGROUND OF THE INVENTION

The present invention relates generally to power conversion and conditioning and, more particularly, to a compensator for reducing current harmonics from an unbalanced load.

Power plants are linked to power consuming facilities (e.g., buildings, factories, etc.) via utility grids designed so as to be extremely efficient in delivering large amounts of power. To facilitate efficient distribution, power is delivered over long distances as low frequency three-phase AC current.

Despite being distributable efficiently, low frequency AC current is sometimes not suitable for end use in consuming facilities. Thus, prior to end use, power delivered by a utility has to be converted to a usable form. To this end, a typical power "conditioning" configuration includes an AC-to-DC rectifier that converts the utility AC power to DC across positive and negative DC buses (i.e., across a DC link) and an inverter linked to the DC link that converts the DC power back to three-phase AC power having an end-useable form (e.g., three-phase relatively high frequency AC voltage). A controller controls the inverter in a manner calculated to provide voltage waveforms required by the consuming facility.

Motors and their associated loads are one type of common inductive load employed at many consuming facilities. While the present invention is applicable to different load types, to simplify this explanation, an exemplary motor with an associated load will be assumed. To drive a motor, an inverter includes a plurality of switches that can be controlled to link and delink the positive and negative DC buses to motor supply lines. The linking/delinking sequence causes voltage pulses on the motor supply lines that together define alternating voltage waveforms. When controlled correctly, the waveforms cooperate to generate a rotating magnetic field inside a motor stator core. The magnetic field induces (hence the nomenclature "induction motor"), a field in motor rotor windings. The rotor field is attracted to the rotating stator field, and hence the rotor rotates within the stator core.

Generally, a three-phase voltage source inverter is used to drive a three-phase balanced load. Under this condition, the inverter itself generates only high order current harmonics to its DC link side. The average current flowing inside the DC link side is constant. This can dramatically reduce the ripple current of its DC link capacitor. Thus, it is much easier for the drive to generate high quality input current waveforms using various topologies, (e.g., multiple phase rectifier system, regenerative drive, passive and active filtering rectifier system, etc.) Typically, it is not a problem for a standard designed product to meet IEEE 519 current harmonics specifications under three-phase balanced load conditions.

However, it is not uncommon to use a three-phase inverter product to drive a single-phase load such as a heater. This arrangement reduces the number of drive types that a user must stock and maintain. Due to a single phase configuration, a large number of low order current harmonics are generated in the DC link. With these low order harmonics, a corresponding large number of low order current harmonics can be generated by the rectifier system. It is typically not possible to have a standard design inverter drive a one phase load and still meet IEEE 519 current harmonics specifications. Moreover, a significant amount of the current and voltage stresses are added to either the DC link or the rectifier side components, thus reducing the reliability of the overall drive.

To this end, FIG. 1A illustrates the input current of a three-phase drive system with an 18 pulse front end rectifier driving a single-phase load, and FIG. 1B illustrates the input current of a three-phase drive system driving a conventional three-phase load. Note the distortions in the input current evident in FIG. 1A when a single-phase load is driven. FIG. 2A illustrates the DC link current of a three-phase drive system driving a single-phase load, and FIG. 2B illustrates the DC link current of a three-phase drive system driving a conventional, three-phase load. Again notice the large amount of ripple voltage seen in the DC link current under single-phase load conditions. In addition to causing input current and DC link distortions, the low-order current associated with a single-phase load driven by a three-phase converter can cause stability problems in controlling of the rectifier.

BRIEF SUMMARY OF THE INVENTION

At least some embodiments of the present invention include a compensator circuit for reducing low order input current harmonics in a three-phase drive system driving a single-phase load, the three-phase drive system including a three-phase source voltage connected to a rectifier system connected to a DC link capacitor connected to a three-phase voltage source inverter that provides three-phase power. The compensator can reduce low-order current harmonics to a level that complies with the IEEE 519 current harmonic specifications. The compensator also is cost-efficient and can easily be modified depending on the specific characteristics of the one-phase load.

The compensator circuit may be an inductor or a capacitor with an inductor.

Thus, it is one object of at least one embodiment of the invention to provide a passive compensator circuit that can be easily sized for a specific drive unit and one-phase load and can be easily installed into such a drive unit.

At least some other inventive embodiments include two identical compensator circuits in order to reduce the negative effects caused by a single-phase load being driven by three-phase power. The identical compensator circuits may be an inductor or a capacitor with an inductor.

Thus, it is an object of at least some inventive embodiment of the invention to allow for the components of the drive to have lower ratings and for easier control because of the symmetry of the compensators.

These and other objects, advantages and aspects of the invention will become apparent from the following description. The particular objects and advantages described herein may apply to only some embodiments falling within the claims, and thus do not define the scope of the invention. In the description, reference is made to the accompanying drawings which form a part hereof, and in which there is shown a preferred embodiment of the invention. Such embodiment does not necessarily represent the full scope of the invention, and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1A:
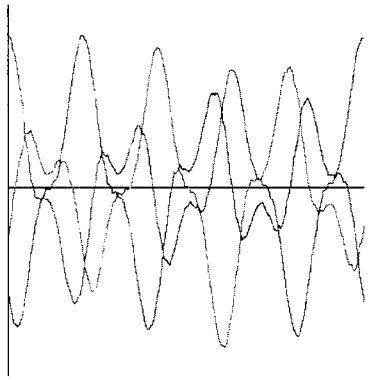
FIGS. 1A and 1B are graphs illustrating input current for a three-phase drive with an 18 pulse front end rectifier powering a single-phase load and a three-phase load, respectively.
Figure 1B:
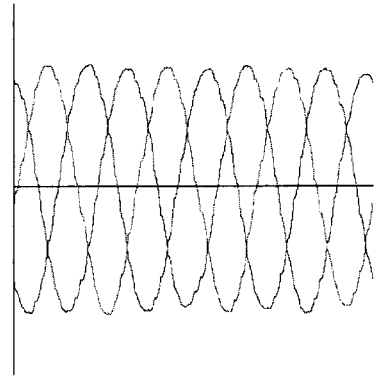

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the claims at the end of the specification. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 3:
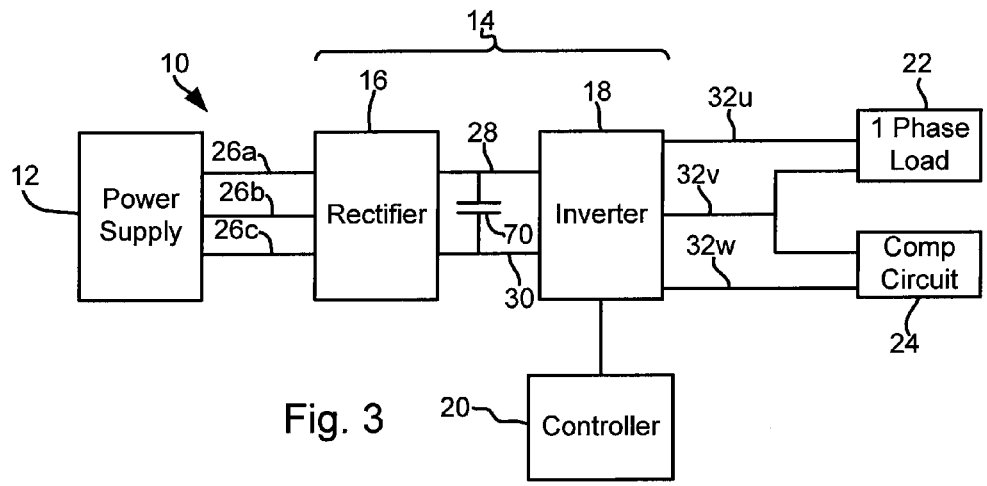
FIG. 3 is a simplified block diagram of a drive system in accordance with one embodiment of the present invention.

Referring now to the drawings wherein like reference numbers correspond to similar components throughout the several views and, specifically, referring to FIG. 3, the present invention shall be described in the context of a drive system 10. The drive system 10 includes a power supply 12, a drive unit 14, including a rectifier 16, an inverter 18, and a controller 20, a single-phase load 22 (e.g., a single-phase motor or heater), a compensator circuit 24, and a plurality of lines and buses that link the aforementioned components together in the manner described hereinafter.

Still referring to FIG. 3, the power supply 12 provides three-phase AC voltage to rectifier 16. The nominal line voltage of power supply 12 may vary depending on the particular implementation. Rectifier 16 receives three-phase power from the power supply 12 over lines 26a, 26b, and 26c and converts the AC power to DC. The rectifier 16 provides the DC power to inverter 18 on positive and negative DC buses 28 and 30, respectively. There are various types of rectifiers 16 employed to convert the AC power to DC. Some rectifiers are passive and do not require input from a controller (e.g., controller 20). For example, a multiple phase (e.g., 6,18, 24) diode rectifying bridge or a rectifier with a passive or an active filter circuit may be used in conjunction with a bus capacitor and filters to perform the rectifying function. The bus capacitor 70 is also known as a DC link capacitor because it is connected to positive and negative DC buses 28 and 30 that link rectifier 16 to inverter 18. Other types of rectifiers are active. For example, a pulse width modulated (PWM) rectifier includes a plurality of switching transistors controlled by the controller 20 to generate the DC potential across the bus capacitor (DC link capacitor). Active PWM rectifiers are sometimes employed where energy present in load 22 (e.g., the motor windings) is regeneratively supplied back to the power supply 12 when load 22 is disconnected. In the passive rectifier case, such power may be dissipated in braking resistors coupled across load 22 when the load is disconnected.

The inverter 18 is positioned between positive and negative DC buses 28, 30, respectively, of the rectifier 16. Although not illustrated, as is well known in the motor control industry, inverter 18 includes a plurality of switching devices (e.g., IGBT's, BJT's, etc.) that are positioned between the positive and negative DC buses 28, and supply lines 32u, 32v, and 32w. Controller 20 opens and closes specific combinations of the inverter switches to generate positive and negative DC voltage pulses on each of supply lines 32u, 32v, and 32w. By opening and closing the inverter switches in specific sequences, inverter 18 generates AC voltages having controllable amplitudes and frequencies on each of the supply lines 32u, 32v, and 32w. Drive unit 14 generates AC voltages on lines 32u, 32v, and 32w that are substantially 120 degrees out of phase with each other so that drive unit 14 provides three-phase power. Lines 32u, 32v, and/or 32w are coupled to load 22 and compensator circuit 24, as will be described in greater detail below.

As is well known in the art, the inverter 18 may have various topologies, including a voltage source inverter and a current source inverter. Typically, a voltage source inverter includes a flyback diode in parallel with each of the IGBT switching devices, while a current source inverter includes a diode in series with the switching device. The voltage output of the voltage source inverter is a PWM pulse signal, while the current source inverter generally provides a smooth sinusoidal output. In the art, current source inverters are employed for high voltage, high current applications (e.g., >1000V), while voltage source inverters are employed in systems with lower voltage ratings.

Referring to a first embodiment shown in FIG. 3, a single-phase load 22 is connected in between lines 32$u$ and 32$v$. Load 22 can be connected in between any two of the lines 32$u$, 32$v$, and 32$w$, and then the compensator circuit 24 can be connected in between the line that the load 22 is not connected to and either of the lines to which the load is connected. For instance, as illustrated in FIG. 3, compensator circuit 24 is connected between line 32$w$, which is not connected to load 22, and line 32$v$, which is connected to load 22. As another instance, compensator circuit 24 could be connected been lines 32$w$ and 32$u$ (not illustrated) where load 22 is linked as shown in FIG. 3.

The compensator circuit 24 suppresses low frequency harmonics caused by the single-phase load 22 drawing power from the three-phase power supplied by the drive unit 14. For example, an uncompensated single-phase load 22 generates a large amount of low-order current harmonics on the DC link capacitor (not illustrated) that resides between the rectifier 16 and the inverter 18. These harmonics increase the ratings of the DC link capacitor and increase the ripple voltage of the DC link capacitor. An uncompensated single-phase load 22 can also heavily distort the input current waveform to the drive 14 on the lines 26$a$, 26$b$, and 26$c$ so that it is not possible to meet some of the industrial standard harmonics specifications (e.g., IEEE 519). Additionally, an uncompensated single-phase load 22 can disrupt the control of an active front end rectifier thereby adversely affecting drive control.

Figure 5A:
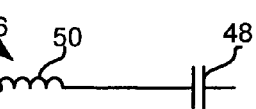
FIGS. 5A and 5B are schematic views of inductor compensator circuits.
Figure 5B:

Referring to FIGS. 5A and 5B, in accordance with an embodiment of the invention, first and second compensator circuits 38 and 42 include an inductor 40 and an inductor 40 in series with a damping resistor 44. Compensator circuits 38 and 42 are referred to hereinafter as inductive compensators. The sizing of inductor 40 will be discussed hereinafter. The damping resistor 44 can be sized and configured so as to dampen any unwanted harmonics and/or oscillations.

Referring now to FIGS. 3, 5A and 5B, in an embodiment of the invention employing only one compensator circuit, compensator circuit 24 can be either compensator circuit 38 comprising an inductor 40 or compensator circuit 42 comprising an inductor 40 and a damping resistor 44. The determination and calculation of the sizing of compensator circuit 24 components is discussed hereinafter. For the purpose of these calculations, it is assumed that load 22 is a single-phase load that has an inductance and a resistance. Ignoring the high frequency components of terminal voltage and current, the fundamental component of the load terminal voltage and current can be expressed as:

$$V_l(t) = V_{lm} \cdot \cos(\omega t)$$

$$i_l(t) = I_{lm} \cdot \cos(\omega t - \phi) \quad (1)$$

where $V_{lm}$ and $I_{lm}$ are the amplitude of the load voltage and load current, respectively, $\omega$ is the angular speed of the single-phase load 22 and $\phi$ is the power factor angle of the single-phase load 22. Based on the fundamental components of the load terminal voltage and current, the instantaneous active power flowing into the load 22 can be expressed as:

$$P_l(t) = V_l(t) \cdot i_l(t) = \frac{V_{lm} I_{lm}}{2} [\cos\varphi + \cos(2\omega t - \varphi)] \quad (2)$$

If there is no compensator circuit, the DC link current generated by the load 22 can be expressed as:

$$i_{dco,1}(t) = \frac{P_l(t)}{V_{dc}} = \frac{V_{lm} I_{lm}}{2V_{dc}} [\cos\varphi + \cos(2\omega t - \varphi)] \quad (3)$$

where $i_{dco,1}(t)$ is the DC link current caused by the single-phase load 22 directly and $V_{dc}$ is the DC link voltage. Equation (3) demonstrates that a large amount of second-order harmonics exist in the DC link current. If nothing compensates for the second-order harmonics, the drive 10 cannot provide high quality input current waveforms. Moreover, since most of these harmonic currents flow into the DC link capacitor, the current flowing into the capacitor increases dramatically and the capacitor may be damaged.

The inventive compensator circuits can help to cancel out this harmonic current. In general, the compensator circuit voltage and current can be expressed as:

$$V_c(t) = V_{cm} \cdot \cos(\omega t - \theta)$$

$$i_c(t) = I_{cm} \cdot \cos(\omega t - \theta - \phi_c) \quad (4)$$

where $V_{cm}$ and $I_{cm}$ are the amplitudes of the compensator circuit voltage and current, respectively, $\theta$ is the angle difference between the load voltage and the compensator circuit voltage, and $\phi_c$ is the power factor angle of compensator circuit. Generally, for an inductive compensator circuit such as circuits 38 and 42, $\phi_c$ tends to be close to $\pi/2$. Generally, for a capacitive compensator circuit as discussed hereinafter, $\phi_c$ tends to be close to $-\pi/2$. Based on Equation (4), the instantaneously active power flowing into the compensator circuit can be expressed as:

$$P_c(t) = V_c(t) \cdot i_c(t) = \frac{V_{cm} I_{cm}}{2} \cos(2\omega t - 2\theta - \varphi_c) \quad (5)$$

If the DC link capacitor is sized appropriately and the DC bus voltage can be assumed as a constant, the DC link current generated by the compensator circuit can be expressed as:

$$i_{dco,c}(t) = \frac{P_c(t)}{V_{dc}} = \frac{V_{cm} I_{cm}}{2V_{dc}} \cos(2\omega t - 2\theta - \varphi_c) \quad (6)$$

where, $i_{dco,c}(t)$ is the DC link current generated by the compensator circuit. The following equation can be used to compensate for the low order DC link current harmonics by canceling them out:

$$\frac{V_{cm} I_{cm}}{2V_{dc}} \cos(2\omega t - 2\theta - \varphi_c) = \frac{V_{lm} I_{lm}}{2V_{dc}} \cos(2\omega t - \varphi) \quad (7)$$

From Equation (7), the following equation can be derived:

$$V_{cm} I_{cm} = V_{lm} I_{lm}$$

$$\theta = \frac{\varphi}{2} - \frac{\varphi_c}{2} \pm \frac{\pi}{2} \quad (8)$$

Equation (8) can be used to calculate the size of a compensator circuit that will compensate for low-order current harmonics generated by a particular one-phase load on a three-phase drive.

The use of a three-phase inverter to drive a single-phase load tends to require that the inverter have an increased rating. Thus, it is important to minimize the overall drive rating by considering the following boundary conditions: 1) the load and compensator terminal voltages should not be over-modulated, and 2) the three-phase currents should be minimized for the overall operating conditions of the inverter. The design/sizing of the compensator circuit depends on whether the compensator is inductive (compensators 38 and 42) or capacitive (discussed hereinafter).

Inductive compensators, such as compensators 38 and 42, for use in an embodiment of the present invention employing only one compensator circuit as shown in FIG. 3 can be designed as follows. The impedance of an inductive compensator circuit can be expressed as:

$$|Z_c| = \frac{V_{cm}}{I_{cm}} = \omega L_c \quad \varphi_c = \frac{\pi}{2} \tag{9}$$

Figure 2A:
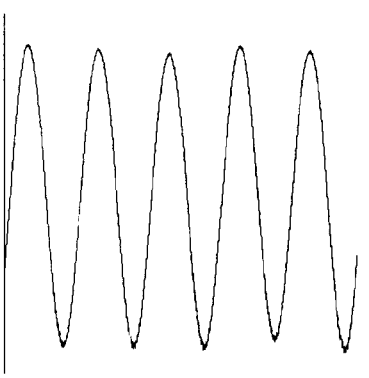
FIGS. 2A and 2B are graphs illustrating DC link current for a three-phase drive powering a single-phase load and a three-phase load, respectively.
Figure 2B:
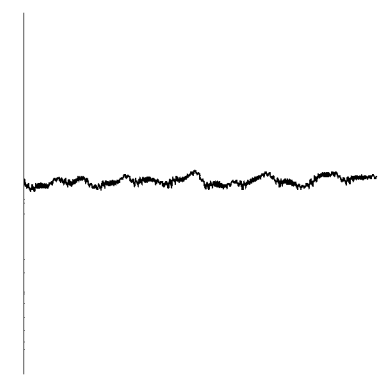

The first step in sizing the inductive compensator is to determine the best angle difference between the compensator voltage and the load voltage. Equation (8) shows that there are two solutions to cancel out the low-order current harmonics. These two solutions provide the same current ratings for both the load and the compensator circuit. A better solution can be determined by comparing the current ratings to the phase on the line to which both the load and the compensator are connected (e.g., line 32v in FIG. 2). By combining Equations (4) and (8), the current waveforms of the compensator circuit can be expressed as:

$$i_c(t) = I_c \cdot \cos(\omega t - \theta - \varphi_c) = I_c \cos\left(\omega t - \frac{\varphi + \varphi_c \mp \pi}{2}\right) \tag{10}$$

Then the current for the phase on the line to which both the load and compensator are connected can be calculated as $$i_{phase\_b}(t) = -i_c(t) - i_l(t) = -I_{cm}\cos\left(\omega t - \frac{\varphi + \varphi_c \mp \pi}{2}\right) - I_{lm}\cos(\omega t - \varphi) \tag{11}$$

To allow for the minimum rating of the drive, the following angle difference has to be close to $\pi$ in Equation (11):

$$|\angle i_c - \angle i_l| = \left|\frac{-\varphi + \varphi_c \mp \pi}{2}\right| \tag{12}$$

For example, for an inductive compensator where load current angle $\phi \in \{0, \pi/4\}$, the following equations based on Equation (12) can be written:

$$|\angle i_c - \angle i_l| \in \left\{\frac{\pi}{4}, \frac{3\pi}{8}\right\} \text{ if } \theta = \frac{\varphi}{2} - \frac{\varphi_c}{2} + \frac{\pi}{2} \tag{13}$$

$$|\angle i_c - \angle i_l| \in \left\{\frac{5\pi}{8}, \frac{3\pi}{4}\right\} \text{ if } \theta = \frac{\varphi}{2} - \frac{\varphi_c}{2} + \frac{\pi}{2} \tag{14}$$

Equation (14) is a good solution because it closes to $\pi$ and tends to generate lower current ratings to the phase on the line to which both the load and compensator are connected.

The second step in sizing the inductive compensator is the determination of the inductance value. By combining Equations (8) and (9), the terminal inductance of the inductive compensation circuit can be expressed as:

$$L_c = \frac{V_{cm}}{\omega I_{cm}} = \frac{1}{\omega} \cdot \frac{V_{cm}^2}{V_{cm} I_{cm}} = \frac{V_{cm}^2}{\omega V_{lm} I_{lm}} \leq \frac{V_{cmax}^2}{\omega V_{lm} I_{lm}} = L_{c,max} \tag{15}$$

In Equation (15), $\omega V_{lm} I_{lm}$ is mainly determined by the characteristics of the load. $V_{1\ max}$ is the maximum allowable voltage of the compensation circuit that is determined by the DC bus voltage $V_{dc}$, load voltage $V_{lm}$ and angle $\theta$. When $V_{lm}$, $\theta$, and $V_{dc}$ are determined, the $V_{cmax}$ can be derived using phasor analysis. Generally, the inductance of the compensator circuit can be set as $L_{c,max}$ for minimization of the inverter current rating.

The third step in sizing the inductive compensator is the determination of the current ratings of the compensator circuit. Once the inductance of the inductive compensator circuit is determined, the current rating of the compensator circuit can be expressed as:

$$I_{cm} = \sqrt{\frac{V_{cm} I_{cm}}{\omega L_c}} = \sqrt{\frac{V_{lm} I_{lm}}{\omega L_c}} \leq \max\left(\sqrt{\frac{V_{lm} I_{lm}}{\omega}}\right) \cdot \sqrt{\frac{1}{L_c}} \tag{16}$$

Equation (16) shows that the current ratings of the compensation circuit can be determined by the selected inductance $L_c$ and maximum $$\frac{V_{lm} I_{lm}}{\omega}.$$

The final step in sizing the inductive compensator is the determination of the maximum current ratings of three-phase inverter legs. By combining the selected solution discussed in Equations (14), (15) and (16) and by comparing the amplitudes of $i_l(t)$, $i_c(t)$ and the phase on the line to which both the load and compensator are connected as $-i_1(t)-i_c(t)$) the maximum current rating of the phase on the line to which both the load and compensator are connected can be calculated.

Figure 6A:
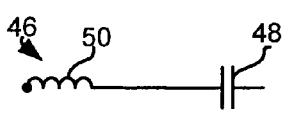
FIGS. 6A and 6B are schematic views of a capacitive compensator circuit.
Figure 6B:
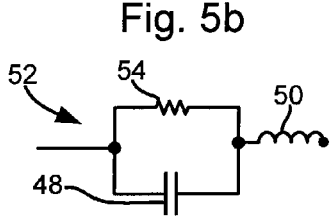

Referring to FIGS. 6A and 6B, in accordance with inventive embodiments, a compensator circuit 46 includes a capacitor 48 connected in series with an inductor 50, and a compensator circuit 52 includes a capacitor 48 connected in series with an inductor 50 and in parallel with a damping resistor 54, respectively. Compensator circuits 46 and 52 can be considered to be capacitive compensators because the impedance of the inductor 50 is generally much smaller than that of the capacitor 48. The impedance of inductor 50 is determined by the switching frequency of the inverter. To avoid resonance problems, the components of the compensation circuits 46 and 52 can be sized so that the resonance frequencies of circuits 46 and 52 are much higher than the fundamental frequency of the inverter 18 and much lower than the inverter switching frequency. Further sizing of the capacitor 42 and inductor 44 will be discussed hereinafter. The damping resistor 54 can be sized and configured so as to dampen any unwanted harmonics and/or oscillations (e.g., damping resistor 54 can be 1.6% of the pu value).

Referring now to FIGS. 3, 6A and 6B, in an embodiment of the invention employing only one compensator circuit, compensator circuit 24 can be either compensator 46 comprising a capacitor 48 and an inductor 50 or compensator 52 comprising a capacitor 48, an inductor 50, and a damping resistor 54.

Capacitive compensators, such as compensators 46 and 52, for use in an embodiment of the present invention employing only one compensator circuit as shown in FIG. 3 can be sized as follows. The impedance $Z_c$ of the capacitive compensator and its angle $\phi_c$ can be expressed as:

$$|Z_c| = \frac{V_{cm}}{I_{cm}} = \frac{1}{\omega C_c} - \omega L_c \approx \frac{1}{\omega C_c} \quad \varphi_c = -\frac{\pi}{2} \tag{17}$$

The first step in sizing the capacitive compensator is to determine the optimum angle difference between the compensator voltage and the load voltage. To allow for the minimum rating of the drive, the angle difference of $i_c$ and $i_l$ has to be close to $\pi$ in the following equation:

$$|\angle i_c - \angle i_l| = \left|\frac{-\varphi + \varphi_c \mp \pi}{2}\right| \tag{18}$$

For example, when the load current angle $\phi \in \{0, \pi/4\}$, then from Equation (18), the following equations can be expressed:

$$|\angle i_c - \angle i_l| \in \left\{\frac{3\pi}{4}, \frac{7\pi}{8}\right\} \quad \text{if } \theta = \frac{\varphi}{2} - \frac{\varphi_c}{2} + \frac{\pi}{2} \tag{19}$$

$$|\angle i_c - \angle i_l| \in \left\{\frac{\pi}{4}, \frac{3\pi}{8}\right\} \quad \text{if } \theta = \frac{\varphi}{2} - \frac{\varphi_c}{2} + \frac{\pi}{2} \tag{20}$$

The first solution, Equation (19) is a good solution because it closes to $\pi$ and tends to generate lower current ratings to the phase on the line to which both the load and compensator are connected.

The second step in sizing the capacitive compensator is the determination of the inductance and capacitance values. Generally, the impedance of the inductor in the capacitive compensator is much smaller than that of the capacitor. The impedance of the inductor is mainly determined by the switching frequency of the inverter (e.g., a 0.03 to 0.05 pu value can be selected). By neglecting the influence of the inductance of the inductor and combining Equations (8) and (17), the capacitance of the capacitive compensator can be expressed as:

$$C_c = \frac{I_{cm}}{\omega V_{cm}} = \frac{V_{cm} I_{cm}}{\omega V_{cm}^2} \geq \frac{V_{lm} I_{lm}}{\omega} \cdot \frac{1}{V_{cmax}^2} = C_{c,min} \tag{21}$$

In Equation (21), $$\frac{V_{lm} I_{lm}}{\omega}$$

is mainly determined by the characteristics of the load. $V_{c\,max}$ is the maximum allowable voltage of the compensator which is decided by the DC bus voltage $V_{dc}$, load voltage $V_{lm}$, and angle $\theta$. Generally, the capacitance of the compensator can be set as $C_{c,min}$ for minimization of the inverter current rating. To avoid resonance, it is crucial to select the resonance frequency of this compensator circuit to be much higher than the highest fundamental frequency of the load and much lower than that of the switching frequency of the inverter.

The third step in sizing the capacitive compensator is the determination of the current ratings of the compensator circuit. Once the inductance of the compensator circuit is determined, the current rating of the compensator can be calculated as:

$$I_{cm} = \sqrt{\omega C_c V_{cm} I_{cm}} = \sqrt{\omega C_c V_{lm} I_{lm}} \leq \max(\sqrt{\omega V_{lm} I_{lm}}) \cdot \sqrt{C_c} \tag{22}$$

Equation (22) illustrates that the current ratings of the compensator can be determined by the selected capacitance $C_c$ and maximum load $\omega V_{lm} I_{lm}$.

The final step in sizing the capacitive compensator is the determination of the maximum current ratings of three-phase inverter legs (which are connected to supply lines 32u, 32v, and 32w). By combining the selected solution discussed in equations (20), (21) and (22), the maximum current rating of the phase on the line to which both the load and compensator are connected can be calculated using phasor analysis.

Figure 4:
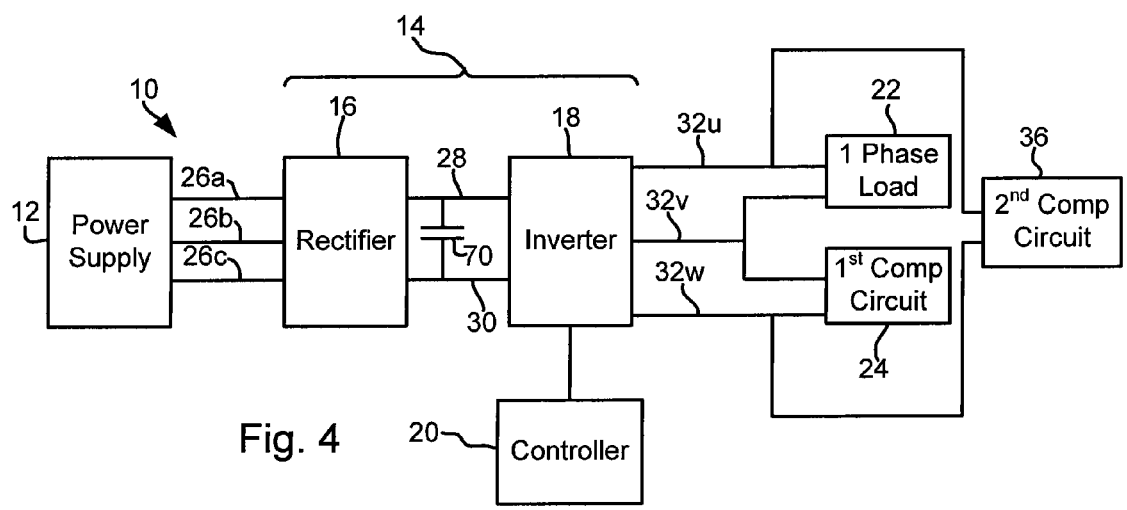
FIG. 4 is a simplified block diagram of a drive system in accordance with another embodiment of the present invention.

Referring to FIG. 4, a second embodiment of the invention is shown where the drive system 10 may include two identical compensator circuits. The drive system 10 includes a power supply 12, a drive unit 14, including a rectifier 16, an inverter 18, a controller 20, a load 22 (e.g., a heater), a first compensator circuit 34, a second compensator circuit 36, and a plurality of lines and buses that link the aforementioned components together in the manner described hereinafter. Lines 26a, 26b, and 26c connect power supply 12 to rectifier 16. DC buses 28 and 30 are connected by DC link capacitor 70 and connect rectifier 16 to inverter 18. Lines 32u, 32v, and 32w are connected to the inverter 18 and carry three-phase AC power generated by the drive unit 14. Load 22 is connected in between lines 32u and 32v, compensator circuit 34 is connected in between lines 32v and 32w and compensator circuit 36 is connected in between lines 32u and 32w.

The design/sizing of the compensator components of the two-compensator embodiment can be simplified similarly to the hereinbefore described design/sizing methodology of the compensator circuits of the one-compensator embodiment. As above, the design/sizing depends on whether the compensator circuit is inductive or capacitive.

Inductive compensators, such as compensator 38 of FIG. 5A and compensator 42 of FIG. 5B, for use in an embodiment of the present invention employing two compensator circuits as shown in FIG. 4 can be designed by first simplifying the design of the two-compensator circuit topology to a one-compensator topology, and then by designing and sizing the equivalent circuit as the one-compensator topology is designed and sized above.

Figure 7A:
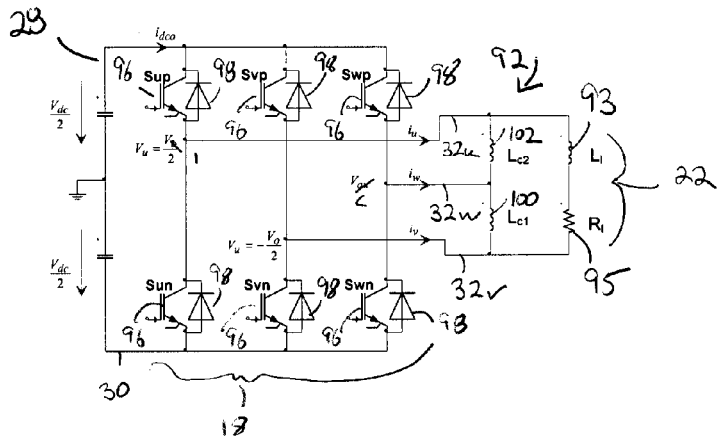
FIGS. 7A through 7D are schematic views of equivalent circuits of an inverter of a drive system with the inductor compensator circuit of FIG. 5A.

FIG. 7A shows the drive side of a circuit 92 with inverter 18 driving one-phase load 22 and with compensator circuit 94 connected to compensate for low-order harmonics caused by load 22. Inverter 18 has gate-controlled switches 96 that are connected in pairs across DC buses 28 and 30, with the junction between each pair of switches being connected to one of supply lines 32u, 32v and 32w. Switches 96 are in parallel with a diode 98. Load 22 is connected to lines 32u and 32v and includes an inductor 93 having an inductance $L_l$ and a resistor 95 having a resistance of $R_l$. First compensator inductor 100 is connected to supply line 32v and to supply line 32w. Second compensator inductor 102 is connected to supply line 32u and to supply line 32w. First compensator inductor 100 and second compensator inductor 102 can have identical impedances $L_{c1}$ and $L_{c2}$, respectively. In order to simplify analysis and design, it is assumed that the neutral point of the DC link voltage is set to 0. The two output phases of the inverter that are connected to the load, the phases on lines 32u and 32v, are set as reversed as shown in the following equations:

$$V_{phase-u}(t) = -V_{phase-v}(t) = \frac{V_l(t)}{2} = V_{lm} \cdot \cos(\omega t) \quad (23)$$

Where $V_{phase-u}(t)$ is the voltage of the phase on line 32u, $V_{phase-v}(t)$ is the voltage of the phase on line 32v, $V_l(t)$ is the load voltage, and $V_l$ is the amplitude of the load voltage. Similarly, the phase voltage of the compensator can be assumed as:

$$V_c(t) = V_{cm} \cdot \cos(\omega t - \theta) \quad (24)$$

Generally, $V_c(t)$ is decided by the load voltage command. The amplitude and phase shift angle of the compensator circuit can be adjusted to create a constant power flow at the output of the inverter.

Figure 7B:
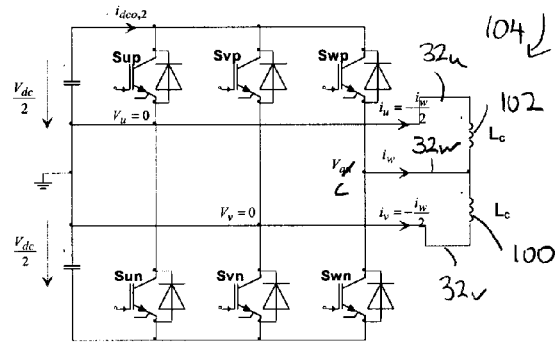

FIG. 7B shows the drive side of a first equivalent circuit 104. The active power generated by the compensator phase (i.e., the phase on line 32w) can be derived from first equivalent circuit 104 by connecting the phase on line 32u, and the phase on line 32v with the neutral point of the DC link voltage. First compensator inductor 100 is connected between supply line 32v and 32w. Second compensator inductor 102 is connected between supply line 32u and 32w. First equivalent circuit 104 does not include a load. Because inductor 100 and inductor 102 are identical, the output current of the phases connected to the load under this condition can be expressed as:

$$i_{phase-u,2}(t) = i_{phase-v,2}(t) = -\frac{i_{c,2}(t)}{2} = \frac{V_{cm}}{\omega L_c} \sin(\omega t - \theta - \varphi_c) \quad (25)$$

Where $i_{phase=u,2}(t)$, $i_{phase-v,2}(t)$, and $i_{c,2}(t)$ are the three output currents directly generated by the phases connected to the load. $V_{cm}$ is the amplitude of the compensator voltage, $L_c$ is the inductance of both compensators (i.e., $L_c = L_{c1} = L_{c2}$), and $\phi_c$ is the angle of both compensator inductors.

Figure 7C:
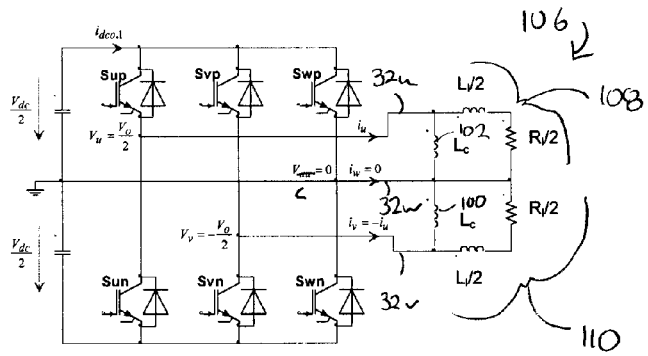

FIG. 7C shows the drive side of a second equivalent circuit 106 derived when $V_c$ (i.e., the voltage of the phase on line 32w) is connected to the neutral point of the DC link voltage. Load 22 has been split into two equivalent loads 108 and 110 that are each equal to half the impedance of load 22 (half the inductance of inductor $L_l$ of load 22 and half the resistance of resistor $R_l$). Equivalent load 108 is connected between supply line 32u and supply line 32w. Equivalent load 110 is connected between supply line 32v and supply line 32w. First compensator inductor 100 is connected between supply line 32v and 32w. Second compensator inductor 102 is connected between supply line 32u and 32w. The active power generated by the compensator phase can be derived by connecting the phases connected to the load to the neutral point of the DC link voltage. Under this condition, the following equations can be derived because the two compensator circuits are identical to each other:

$$i_{u,1}(t) = i_{v,1}(t) = \frac{i_u(t) - i_v(t)}{2} = \frac{V_{m/2}}{|Z_{c-1}|}\cos(\omega t - \angle Z_{c-1}) \quad (26)$$

$$Z_{c-1} j\omega L_c // \left(\frac{j\omega L_l}{2} + R_l\right)$$

Where $i_{phase-a,1}(t)$, $I_{phase-b,1}(t)$, and $i_{c,1}(t)$ are the three output currents directly generated by the compensator. $Z_{c-1}$ is an equivalent load impedance calculated by paralleling one compensator inductor with half of the load impedance.

Figure 7D:
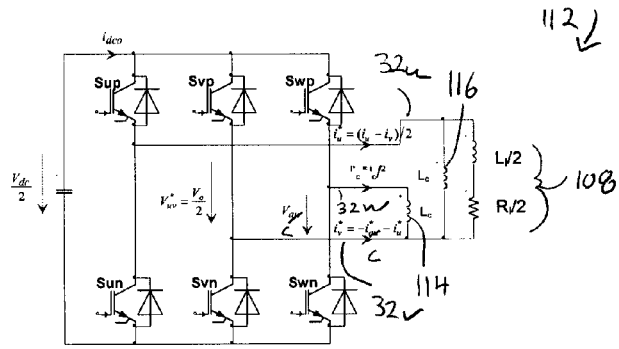

FIG. 7D shows the drive side of a third equivalent circuit 112 derived by combining first equivalent circuit 104 and second equivalent circuit 106. Third equivalent circuit is the two-compensator circuit equivalent to the one-compensator circuit. In equivalent circuit 112, equivalent load 108 is connected between supply lines 32u and 32v and is equal to half the impedance of load 22. A first equivalent compensator inductor 114 is connected between supply lines 32v and 32w. A second equivalent compensator inductor 116 is connected between supply lines 32u and 32v. First equivalent compensator inductor 100 and second equivalent compensator inductor 102 have inductances that are equal to the inductance of $L_c$. Equivalent circuit 112 can be analyzed as above for the one-compensator topologies. In this circuit, the load impedance is derived by paralleling a compensator inductor with half of the load impedance. Design and sizing of the compensators can be made with the voltage and impedance of the equivalent circuit expressed as:

$$\text{Load voltage: } V^*_{phase-u-phase-v}(t) = \frac{V_l(t)}{2} = V_{lm} \cdot \cos(\omega t) \quad (27)$$

$$\text{Load impedance: } Z^*_l = Z_{l-c} = j\omega L_c // \left(\frac{j\omega L_l}{2} + \frac{R_l}{2}\right)$$

$$\text{Compensator voltage: } V^*_c(t) = V_c(t) = V_{cm} \cdot \cos(\omega t - \theta)$$

$$\text{Compensator current: } i^*_c(t) = \frac{i_c(t)}{2}$$

By similar analysis, capacitive compensators, such as compensators 46 of FIGS. 6A and 52 of FIG. 6B, for use in an embodiment of the present invention employing two compensator circuits as shown in FIG. 4, can be designed by first simplifying the design of the two-compensator circuit topology to the one-compensator topology. The sizing of the compensator circuits can be performed as described above for the one-compensator topology too. The equivalent one-compensator circuit for a two-compensator capacitive topology can be expressed by the following equation set:

$$\text{Load voltage: } V^*_{phase-u-phase-v}(t) = \frac{V_l(t)}{2} = V_{lm} \cdot \cos(\omega t) \quad (28)$$

$$\text{Load impedance: } Z^*_l = Z_{l-c} = \frac{1}{j\omega C_c} // \left(\frac{j\omega L_l}{2} + \frac{R_l}{2}\right)$$

$$\text{Compensator voltage: } V^*_c(t) = V_c(t) = V_{cm} \cdot \cos(\omega t - \theta)$$

$$\text{Compensator current: } i^*_c(t) = \frac{i_{c,2}(t)}{2} = \frac{i_c(t)}{2}$$

$$\text{Compensator impedance: } Z^*_c = \frac{1}{2j\omega C_c}$$

Figure 8:
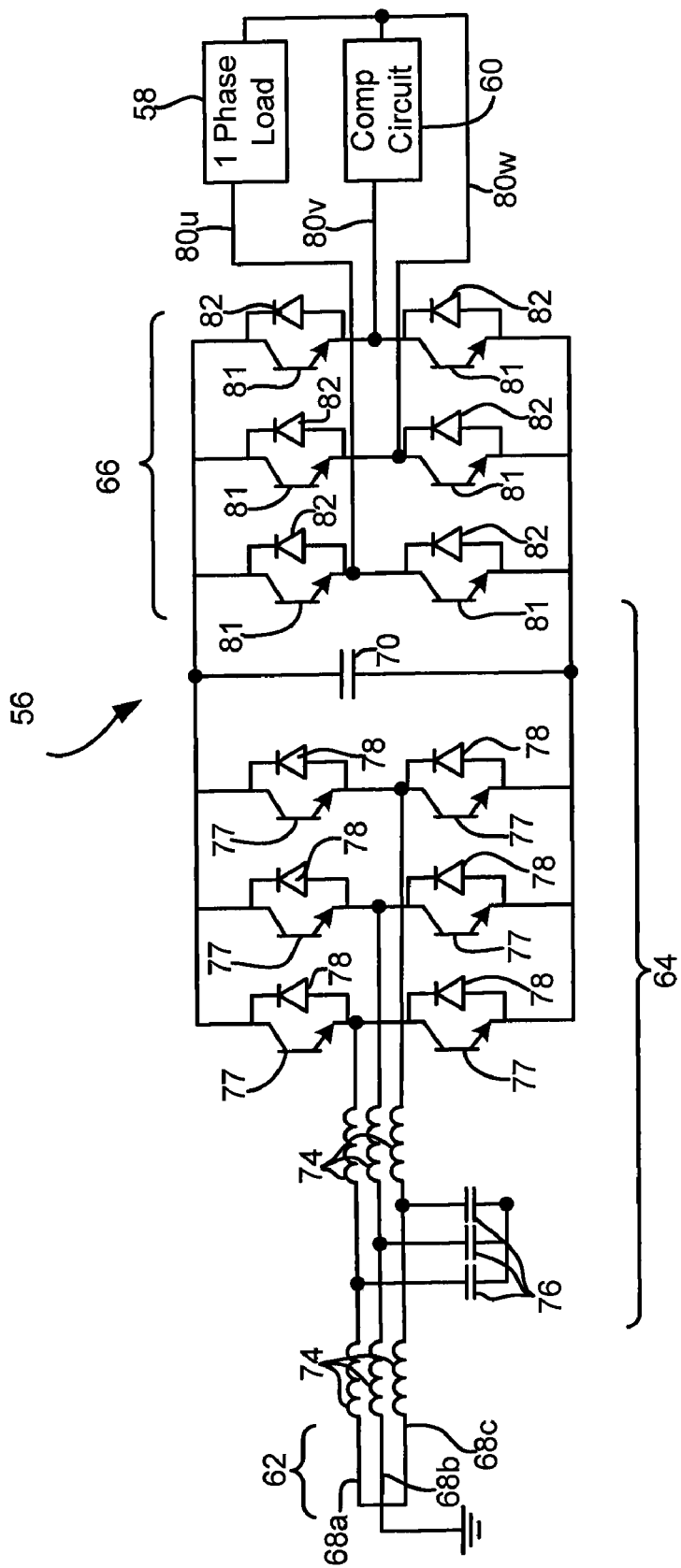
FIG. 8 is a schematic view of a drive system and compensator in accordance with an embodiment of the invention.

FIG. 8 shows an exemplary regenerative drive system 56 providing three-phase power to a single-phase load 58. An inductive compensator circuit 60 (e.g., see FIGS. 5A, 5B) is included to reduce the negative effects caused by the drive 56 providing power to single-phase load 58. The drive 56 includes a power supply 62, rectifier 64, and inverter 66. The power supply 62 provides a three-phase AC voltage received from the utility grid on lines 68*a*, 68*b*, and 68*c*. The rectifier 64 receives three-phase power over lines 68*a*, 68*b*, and 68*c* and converts the AC power to DC. Rectifier 64, shown as an active-front rectifier, includes a DC link capacitor 70 connected in between the positive and negative DC buses 72*a* and 72*b*, respectively. The rectifier further includes a plurality of inductors 74, capacitors 76, switching devices 77, and diodes 78 connected by a plurality of lines and buses. The switching devices 77 are controlled to generate the DC potential across the DC link capacitor 70. The DC buses 72*a* and 72*b* are connected to the inverter 66. The inverter 66 provides three-phase power on supply lines 80*u*, 80*v* and 80*w* by controlling a plurality of switching devices 81 that are positioned in between the DC buses 72*a* and 72*b* and the supply lines 80*u*, 80*v*, and 80*w*. A plurality of diodes 82 are connected in parallel with switching devices 81. The controllers of the rectifier 64 and inverter 66 are not shown. The load 58 is connected in between two phases, namely the phases on lines 80*u* and 80*w*. The compensator circuit 60 is connected in between the phases on lines 80*v* and 80*w*.

Figure 9A:
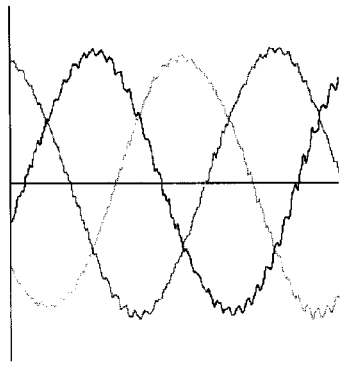
FIGS. 9A and 9B are graphs illustrating input current for a three-phase drive powering a single-phase load with a compensator and a single-phase load without a compensator, respectively.
Figure 9B:
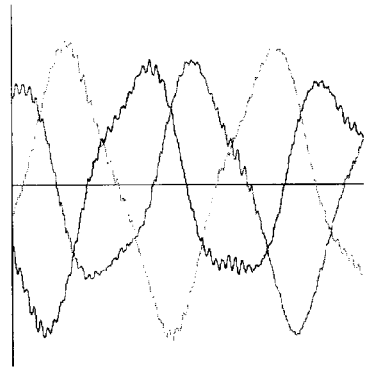
Figure 9C:
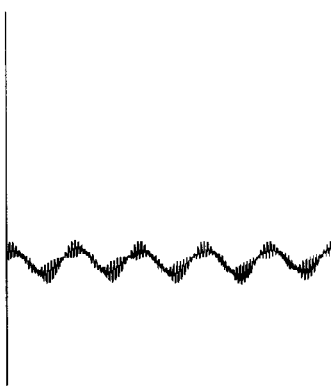
FIGS. 9C and 9D are graphs illustrating DC link current for a three-phase drive powering a single-phase load with a compensator and a single-phase load without a compensator, respectively.
Figure 9D:
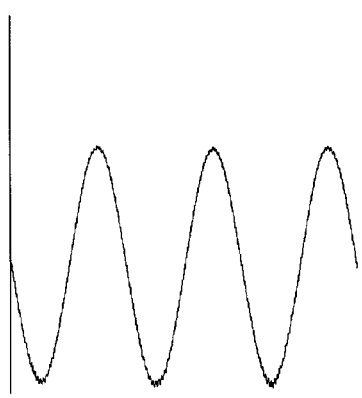

The benefits of using the FIG. 8 compensator are illustrated in FIGS. 9A through 9D. FIG. 9A illustrates the input current on lines 68*a*, 68*b*, and 68*c* when the FIG. 8 compensator is used. Note the lack of distortions in the input current evident in FIG. 9A when the FIG. 8 compensator circuit is used. FIG. 9B illustrates the input current on lines 68*a*, 68*b*, and 68*c* when the compensator is not used. Note the distortions in the input current evident in FIG. 9B when the compensator is not used. FIG. 9C illustrates the DC link voltage on the DC link capacitor 70 when the compensator is used. Note the lack of a large amount of ripple voltage seen in the DC link current evident in FIG. 9C when the compensator is used. FIG. 9D illustrates the DC link voltage on the DC link capacitor 70 when the compensator is not used. Note the large amount of ripple voltage seen in the DC link current evident in FIG. 9D when a compensator is not used.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A system for reducing low order input current harmonics in a three-phase drive system receiving a three-phase source voltage and driving an unbalanced load, the system comprising:
   a rectifier system connected to the three-phase source voltage;
   a DC link capacitor connected to the rectifier system;
   a three-phase voltage source inverter connected to the DC link capacitor and supplying a first phase, a second phase, and a third phase;
   a single-phase load connected between the first phase and the second phase; and
   a compensator circuit connected between the third phase and one of the first phase and the second phase.

2. The system of claim 1, wherein the compensator circuit comprises an inductor.

3. The system of claim 2, wherein the inductor is sized so that a DC link current caused by the compensator substantially cancels out a DC link current caused by the single-phase load.

4. The system of claim 3, wherein the compensator circuit further comprises a damping resistor serially connected to the inductor.

5. The system of claim 1, wherein the following set of equations is used to design the compensator circuit:

$$V_{cm}I_{cm} = V_{lm}I_{lm}$$

$$\theta = \frac{\varphi}{2} - \frac{\varphi_c}{2} \pm \frac{\pi}{2}$$

$$|\angle i_c - \angle i_l| = \left|\frac{-\varphi + \varphi_c \mp \pi}{2}\right|$$

$$L_c = \frac{V_{cm}}{\omega I_{cm}} = \frac{1}{\omega} \cdot \frac{V_{cm}^2}{V_{cm}I_{cm}} = \frac{V_{cm}^2}{\omega V_{lm}I_{lm}} \leq \frac{V_{cmax}^2}{\omega V_{lm}I_{lm}} = L_{c,max}$$

$$I_{cm} = \sqrt{\frac{V_{cm}I_{cm}}{\omega L_c}} = \sqrt{\frac{V_{lm}I_{lm}}{\omega L_c}} \leq \max\left(\sqrt{\frac{V_{lm}I_{lm}}{\omega}}\right) \cdot \sqrt{\frac{1}{L_c}}$$

where $V_{cm}$ is an amplitude of a compensator circuit voltage, $I_{cm}$ is an amplitude of a compensator circuit current, $V_{lm}$ is an amplitude of a single-phase load voltage, $I_{lm}$ is an amplitude of a single-phase load current, θ is an angle difference between the single-phase load voltage and the compensator circuit voltage, φ is a power factor angle of the single-phase load, $\varphi_c$ is a power factor angle of the compensator circuit, $i_c$ is a compensator circuit current, $i_l$ is a single-phase load current, $L_c$ is a compensator circuit inductance, and ω is an angular speed of the single-phase load, $V_{cmax}$ is a maximum compensation circuit voltage, and $L_{c,max}$ is a maximum compensator circuit inductance.

6. The system of claim 1, wherein the compensator circuit comprises a capacitor serially connected to an inductor.

7. The system of claim 6, wherein the capacitor and inductor are sized so that a DC link current caused by the compensator substantially cancels out a low frequency DC link current caused by the single-phase load.

8. The system of claim 7, wherein the capacitor and inductor are sized so that a resonance frequency of the compensator circuit is substantially higher than a highest fundamental frequency of the inverter and is substantially lower than a switching frequency of the inverter.

9. The system of claim 8, wherein the compensator circuit further comprises a damping resistor connected in parallel to the capacitor.

10. The system of claim 7, wherein the following set of equations is used to design the compensator circuit:

$$V_{cm}I_{cm} = V_{lm}I_{lm}$$

$$\theta = \frac{\varphi}{2} - \frac{\varphi_c}{2} \pm \frac{\pi}{2}$$

$$|\angle i_c - \angle i_l| = \left|\frac{-\varphi + \varphi_c \mp \pi}{2}\right|$$

$$C_c = \frac{I_{cm}}{\omega V_{cm}} = \frac{V_{cm}I_{cm}}{\omega V_{cm}^2} \geq \frac{V_{lm}I_{lm}}{\omega} \cdot \frac{1}{V_{cm}^2} = C_{c,min}$$

$$I_{cm} = \sqrt{\omega C_c V_{cm}I_{cm}} = \sqrt{\omega C_c V_{lm}I_{lm}} \leq \max\left(\sqrt{\omega V_{lm}I_{lm}}\right) \cdot \sqrt{C_c}$$

where $V_{cm}$ is an amplitude of a compensator circuit voltage, $I_{cm}$ is an amplitude of a compensator circuit current, $V_{lm}$ is an amplitude of a single-phase load voltage, $I_{lm}$ is an amplitude of a single-phase load current, $\theta$ is an angle difference between the single-phase load voltage and the compensator circuit voltage, $\phi$ is a power factor angle of the single-phase load, $\phi_c$ is a power factor angle of the compensator circuit, $i_c$ is a compensator circuit current, $i_l$ is a single-phase load current, $C_c$ is a compensator circuit capacitance, and $\omega$ is an angular speed of the single-phase load, $V_{c,max}$ is a maximum allowable compensation circuit voltage, and $C_{c,min}$ is a minimum compensator circuit inductance.

11. A system for reducing low order input current harmonics in a three-phase drive system receiving a three-phase source voltage and driving an unbalanced load, the system comprising:
 a rectifier system connected to the three-phase source voltage;
 a DC link capacitor connected to the rectifier system;
 a three-phase voltage source inverter connected to the DC link capacitor and supplying a first phase, a second phase, and a third phase;
 a single-phase load connected between the first phase and the second phase;
 a first compensator circuit connected between the second phase and the third phase; and
 a second compensator circuit connected between the first phase and the third phase.

12. The system of claim 11, wherein the second compensator circuit is substantially similar to the first compensator circuit.

13. The system of claim 11, wherein the first compensator circuit comprises a first inductor and the second compensator circuit comprises a second inductor; and
 wherein the second inductor is substantially similar to the first inductor.

14. The system of claim 11, wherein first and second inductors are sized so that a DC link current caused by the compensator substantially cancels out a DC link current caused by the single-phase load.

15. The system of claim 14, wherein the first compensator circuit further comprises a first damping resistor serially connected to the first inductor and the second compensator circuit further comprises a second damping resistor serially connected to the second inductor; and
 wherein the second damping resistor is substantially similar to the first damping resistor.

16. The system of claim 11, wherein the first compensator circuit comprises a first capacitor serially connected to a first inductor and the second compensator circuit comprises a second capacitor serially connected to a second inductor; and
 wherein the second capacitor is substantially similar to the first capacitor and the second inductor is substantially similar to the first inductor.

17. The system of claim 16, wherein the first and second inductors and the first and second capacitors are sized so that a DC link current caused by the compensator substantially cancels out a DC link current caused by the single-phase load.

18. The system of claim 17, wherein the first and second inductors and the first and second capacitors are sized so that a resonance frequency of the compensator circuit is substantially higher than a highest fundamental frequency of the inverter and is substantially lower than a switching frequency of the inverter.

19. The system of claim 17, wherein the first compensator circuit further comprises a first damping resistor connected in parallel to the first capacitor, and the second compensator circuit further comprises a second damping resistor connected in parallel to the second capacitor; and
 wherein the second damping resistor is substantially similar to the first damping resistor.

20. A system for reducing low order input current harmonics in a three-phase drive system receiving a three-phase source voltage and driving an unbalanced load, the system comprising:
 a rectifier system connected to the three-phase source voltage;
 a DC link capacitor connected to the rectifier system;
 a three-phase voltage source inverter connected to the DC link capacitor and supplying a first phase, a second phase, and a third phase;
 a single-phase load connected between the first phase and the second phase; and
 a compensator circuit comprising an inductor connected between the third phase and one of the first phase and the second phase.

21. The system of claim 20, wherein the compensator circuit further comprises at least one of a resistor and a capacitor.

22. The system of claim 20, wherein the system further comprises a second compensator circuit connected between the third phase and the other of the first phase and the second phase.

23. The system of claim 20, wherein the compensator circuit is sized so that a DC link current caused by the compensator substantially cancels out a DC link current caused by the single-phase load and so that a rating of the three-phase voltage source inverter is minimized.

* * * * *